Dec. 10, 1940.　　　　G. L. LACSON　　　　2,224,790
ASPARAGUS HARVESTER
Filed April 13, 1939　　2 Sheets-Sheet 1
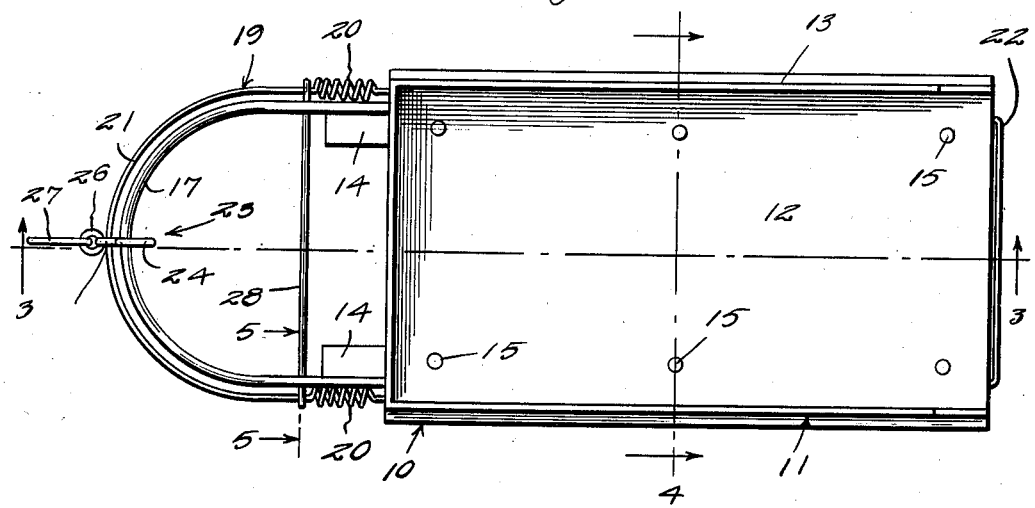
Fig. 1.
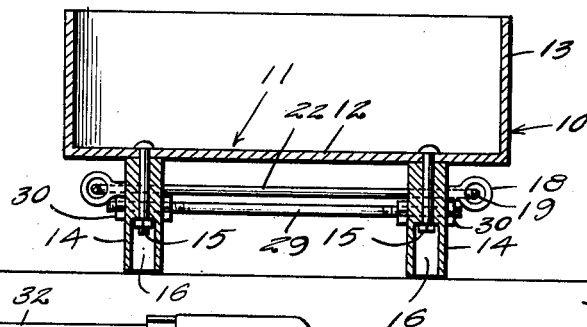
Fig. 4.
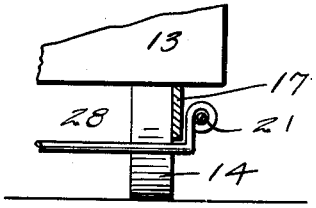
Fig. 5.
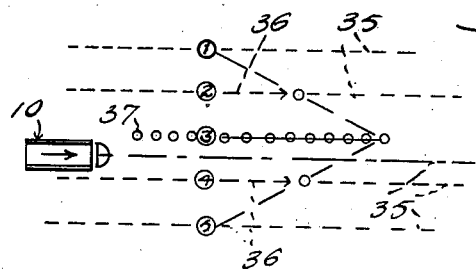
Inventor
G. L. Lacson

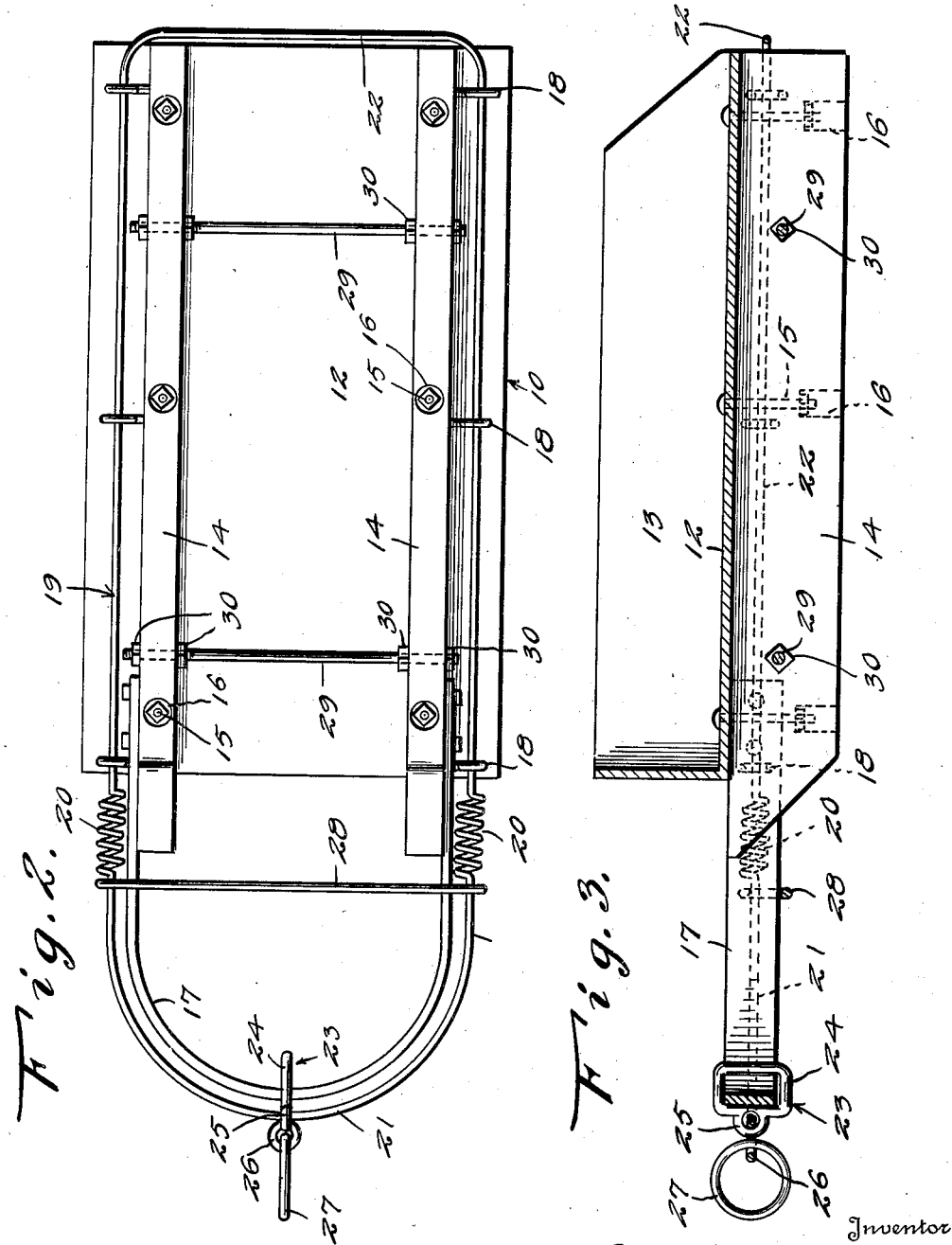

Patented Dec. 10, 1940

2,224,790

UNITED STATES PATENT OFFICE 2,224,790

ASPARAGUS HARVESTER

George L. Lacson, Mendota, Calif.

Application April 13, 1939, Serial No. 267,645

6 Claims. (Cl. 280—24)

This invention relates to improved means particularly adapted for harvesting asparagus.

Large asparagus growers now generally employ contractors who specialize in harvesting asparagus and who employ crews of men for this purpose. The harvesters generally carry a basket in one hand and a knife for cutting the asparagus in the other hand placing the cut asparagus in their baskets and continuing the work until the basket is filled.

It is an object of this invention to eliminate part of the burden of the harvesters by doing away with the baskets and by providing a particular form of truck intended and adapted to move through a field between two rows of the asparagus and to be controlled by a member of the crew whose duty it is to collect the asparagus from a number of the men who are moving simultaneously along adjoining rows and whose asparagus is being stacked along one of said rows adjoining which the truck moves.

More particularly, it is an aim of this invention to provide a sled type vehicle having a truck body mounted on runners, said vehicle being adapted to be drawn by a draft animal or vehicle and provided with resilient hitch means for cushioning sudden jerks from the draft means to prevent dumping or spilling of the asparagus particularly when contained in baskets carried in the truck body.

Other objects and advantages of the invention will hereinafter become more fully apparent from the following description of the drawings, which illustrate a preferred embodiment thereof, and wherein:

Figure 1 is a top plan view of the sled type truck,

Figure 2 is an enlarged bottom plan view of the same,

Figure 3 is a longitudinal vertical sectional view taken on the line 3—3 of Figure 1, Figure 4 is a cross sectional view taken on the line 4—4 of Figure 1, Figure 5 is a vertical sectional view taken on the line 5—5 of Figure 1, Figure 6 is a side elevational view of the asparagus cutting tool, Figure 7 is a top plan view of the blade portion of the same, and Figure 8 is a diagrammatic view illustrating the method of harvesting the asparagus and showing the truck moving between two rows thereof and behind the harvesters.

Referring more particularly to the drawings, wherein like reference characters designate like or corresponding parts throughout the different views, 10 designates generally the truck having the body portion 11 including the platform 12 and the rails 13 along the two longitudinal sides and forward end thereof. The body 11 is supported by the runners 14 which are secured to the underside of the platform 12 by the nut and bolt fastenings 15. The runners 14 are provided in their lower edges with the recesses 16 adapted to receive one end of the fastenings 15 to space them from the engaging edges of said runners.

An arch shaped draft member 17 has its opposite ends bolted to the outer sides of the forward ends of the runners 14 with its intermediate portion projecting forwardly thereof. Eye screws 18 are secured to and project outwardly from the sides of the runners 14 at spaced intervals to form guides for the endless strand of heavy gauge wire 19 which extends along the outer sides of the runners 14 across the back ends thereof and around the outer side of the arch shaped member 17, as best seen in Figure 2. The strand 19 is held in spaced relationship to the sides of the runners 14 and to the arch shaped member 17 by the eyelets 18 which not only support the strand 19 but which form a guide therefor, as will hereinafter be more fully described. Strand 19 is coiled adjacent the forward ends of the two runners 14 to form the contractile coil springs 20 dividing the strand 19 into the portions 21 and 22 which are resiliently disposed relatively to each other by means of the springs 20.

A clevis, designated generally 23, includes a link portion 24 which loosely engages the intermediate portion of the arch shaped member 17, an eyelet 25 formed integral with and projecting outwardly from link 24 and disposed in a plane therewith to receive the portion 21 of the strand 19, which extends therethrough, and an eyelet 26 formed integral with and projecting outwardly from the eyelet 25, and positioned at right angles thereto, to engage a ring 27 which is adapted to be connected to a draft animal or vehicle, not shown. A rod 28 extends transversely of the arch shaped member 17 with its ends engaging the ends of the portion 21 and positioned directly in front of the coil springs 20.

Runners 14 are retained in parallel spaced relationship to each other by the tie-rods 29 the opposite ends of which are threaded and extend through runners 14 and are secured thereto by the nuts 30 which engage said threaded ends and which abut against the opposite sides of said runners.

From the foregoing it will be seen, that a sudden jerk on the ring 27 will be directly imparted to portion 21 and to strand 19, as a whole, causing it to move forwardly until the intermediate portion of its part 22 engages against the rear ends of the runners 14 after which coil springs 20 will be caused to expand until the link 24 engages the inner side of the arch shaped member 17. This cushioning action as provided by the springs 20 will take up any sudden pull on the clevis 23 to prevent the truck 10 from being jerked suddenly into forward motion. This is particularly advantageous in this type of truck in which the body 11 is adapted to contain a plurality of baskets to hold the asparagus being gathered which might be readily upset and spilt by a sudden jerk on the truck 10, and in addition, because the truck will be constantly stopping and starting and the continual sudden jerks would materially decrease the life of the truck.

In Figures 6 and 7 the tool for cutting the asparagus, is shown, and includes the handle member 31, the stem or shank 32, secured at one end thereto, and the blade 33 formed integral with the opposite end of the shank 32. Blade 33 is flattened relatively to the shank 32 and diverges toward its cutting edge 34, similarly to the blade of a screw driver. Blade 34, which is disposed at right angles to the axis of the shank 32, is sharpened and toothed or serrated for cutting the stalks of the asparagus. The tool is adapted to be actuated with a reciprocating motion at an oblique angle to the earth's surface for severing the stalks of the asparagus and it has been found that the cutting edge 34 will be kept sharpened by engagement with the earth after severing an asparagus stalk.

Figure 8 is a diagrammatic view illustrating the use of the truck 10 and the method of harvesting the asparagus, the numerals 1 to 5 indicating five harvesters each working along an adjacent row of asparagus, indicated by the dotted parallel lines 35. Harvesters of the two outer rows, as indicated by the numerals 1 and 5 will hand each handful of the asparagus as gathered to the harvesters of the adjoining rows numbered 2 and 4, respectively, at intervals as indicated by the length of the arrows 36 who will take the asparagus with the asparagus which they have gathered and place it in piles along the central row as indicated by the circles designated 37 so that the operator of the truck sled can gather the piles 37 into the baskets carried by the truck 10. It will be noted that the truck 10 is of the proper size to pass between two adjacent rows of the asparagus and as illustrated is moving between the rows being picked by the men numbered 3 and 4, but if desired and after one side of the truck has been filled it could be shifted to move between the rows being picked by the men numbered 2 and 3 so that the baskets in the other side of the truck could be more conveniently reached and would thus be positioned adjacent to the piles 37.

Various modifications and changes in the invention may obviously be made and are contemplated and the right is therefore reserved to make such changes as do not depart from the spirit and scope of the invention as hereinafter defined by the appended claims.

I claim as my invention:

1. A vehicle of the class described comprising a platform having upwardly extending rails disposed along three of its sides, runners depending from the underside of said platform, an arch shaped member secured to the forward ends of said runners and projecting forwardly of said vehicle, spring means extending around the outer side of said arch shaped member, and a clevis connected to the intermediate portion of said spring means and loosely engaging the intermediate portion of said arch shaped member, said clevis being adapted to be connected to the harness of a draft animal or vehicle.

2. A truck comprising a body portion provided with depending spaced runners, an endless strand of heavy gauge wire extending around the outer sides and ends of said runners and having a portion projecting beyond the forward end of said truck, and contractile coil springs formed integral with said wire strand at the opposite sides and adjacent the forward ends of said runners, said endless strand being slidably connected to the truck, and said forwardly projecting portion of said strand being adapted to be connected to a draft vehicle or animal to provide a resilient hitch for said truck.

3. An asparagus harvesting truck comprising a pair of spaced parallel runners, a body mounted on said runners, an arch shaped member having its opposite ends secured to the forward ends of said runners and projecting forwardly of said truck, an endless strand of wire extending around the outer sides of said runners and around the outer side of said arch shaped member and slidably disposed relatively to said elements, contractile coil springs formed integral with said strand and disposed adjacent the forward ends of said runners, and a clevis connected to said strand and loosely engaging said arch shaped member to provide a resilient hitch connection for said truck.

4. A vehicle draft appliance comprising a vehicle including a body, a rigid draft member fixed to and extending forwardly from said vehicle for loosely engaging draft means, and a resilient draft member yieldably connected to said vehicle and disposed adjacent to said rigid draft member and connected to said draft means.

5. A vehicle draft appliance comprising a rigid yoke shaped draft member fixed at its ends to a vehicle and extending forwardly therefrom, the intermediate portion of said draft member being loosely connected to draft means, and a resilient draft member having a bowed portion disposed adjacent said yoke shaped member and connected to said draft means, said resilient draft member being slidably and yieldably connected to the vehicle.

6. A device as in claim 5, said draft means comprising a clevis having an eyelet in its intermediate portion for closely engaging said resilient draft member, said clevis, at one of its ends, having an elongated loop for loosely engaging the yoke shaped draft member.

GEORGE L. LACSON.